US006741392B2

United States Patent
Fu

(10) Patent No.: US 6,741,392 B2
(45) Date of Patent: May 25, 2004

(54) SYSTEM FOR STABILIZING IMAGES VIEWED THROUGH A PAIR OF BINOCULARS

(75) Inventor: Andrew N. Fu, 1781 Austin Ave., Los Altos, CA (US) 94024

(73) Assignee: Andrew N. Fu, Los Altos, CA (US)

( * ) Notice: Subject to any disclaimer, the term of this patent is extended or adjusted under 35 U.S.C. 154(b) by 0 days.

(21) Appl. No.: 10/327,364

(22) Filed: Dec. 20, 2002

(65) Prior Publication Data

US 2003/0128429 A1 Jul. 10, 2003

Related U.S. Application Data

(60) Provisional application No. 60/342,898, filed on Dec. 21, 2001.

(51) Int. Cl.[7] .............................................. G02B 27/64
(52) U.S. Cl. ..................... 359/557; 359/554; 359/555; 359/556
(58) Field of Search ................. 359/557, 554, 359/555, 556, 819, 480, 417, 418, 419, 481, 482

(56) References Cited

U.S. PATENT DOCUMENTS

| | | | | | |
|---|---|---|---|---|---|
| 5,857,599 | A | * | 1/1999 | Palmer | 224/181 |
| 6,064,520 | A | * | 5/2000 | Nowak et al. | 359/411 |
| 6,211,903 | B1 | * | 4/2001 | Bullister | 348/14.16 |
| 6,333,814 | B1 | * | 12/2001 | Chang et al. | 359/411 |
| 6,439,714 | B1 | * | 8/2002 | Cummings | 351/57 |
| 6,457,838 | B1 | * | 10/2002 | Dugmore et al. | 362/106 |
| 6,560,029 | B1 | * | 5/2003 | Dobbie et al. | 359/631 |
| 6,580,448 | B1 | * | 6/2003 | Stuttler | 348/46 |

* cited by examiner

*Primary Examiner*—Mohammad Sikder
(74) *Attorney, Agent, or Firm*—Burns Doane Swecker Mathis, L.L.P.

(57) ABSTRACT

A stabilizer for an optical instrument, such as a pair of binoculars, including: a forehead mount and an adjustable mechanism for connecting the forehead mount to the optical instrument. The mechanism may include a bracket adapted for attachment to the optical instrument and a support between the forehead mount and the bracket.

12 Claims, 4 Drawing Sheets

SYSTEM FOR STABILIZING IMAGES VIEWED THROUGH A PAIR OF BINOCULARS

RELATED APPLICATION

This application claims priority under 35 U.S.C. §119 to U.S. Provisional Application No. 60/342,898, entitled System for Stabilizing Images Viewed Through a Pair of Binoculars, filed on Dec. 21, 2001, the entire content of which is hereby incorporated herein by reference.

FIELD OF THE INVENTION

The present invention relates to systems for stabilizing an image viewed through a pair of hand-held binoculars.

BACKGROUND OF THE INVENTION

A common problem with binoculars is that it is difficult for an operator to hold them steady when using them. Consequently, the operator will tend to seen an image that is somewhat "jumpy" (due to relative motion between the operator's eyes and the binocular eyepieces). This problem becomes especially acute at higher magnifications.

A variety of systems have been developed for stabilizing images as viewed through binoculars. The most common is simply placing the binoculars on a tripod. Unfortunately, a tripod can be both bulky and take time to set up. Moreover, the use of a tripod also limits the operator's ability to freely move around looking at different objects from different places, since the tripod must be re-setup each time it is moved to a different location on the ground.

Alternative binocular image stabilization systems have been developed. Unfortunately, such systems tend to rely upon complex expensive electronics, or additional internal mirrors.

SUMMARY OF THE INVENTION

The present invention provides a stabilizer for an optical instrument, comprising: a forehead mount; and a mechanism for connecting the forehead mount to the optical instrument. In preferred aspects, the optical instrument is a pair of binoculars, however, the present invention is not so limited. For example, the present invention may also be used to stabilize cameras, or any other hand-held optical instrument. In preferred aspects, the present stabilizer operates by reducing the relative motion between the operator's eyes and the eyepieces of the optical instrument.

In optional preferred aspects, the mechanism for connecting the forehead mount to the optical instrument comprises: a bracket adapted for attachment to the optical instrument; and a support between the forehead mount and the bracket. The support is preferably adjustable such that the distance between the forehead mount and the bracket can be varied. More generally, in its various alternate embodiments, the present stabilizer is adjustable such that the distance between the operator's eyes and the optical instrument's eyepieces is adjustable. Most preferably, the present stabilizer positions the forehead mount such that an observer's eyes are about 10 mm to 25 mm from the eyepieces of the binoculars.

In an exemplary embodiment, the forehead mount is curved in a horizontal plane to wrap around a portion of the operator's forehead. Additionally, a surface of the forehead mount may be curved in a vertical direction so as to permit different operator's to conveniently position the device on their foreheads.

In an exemplary embodiment, the support comprises a rod which is slidably received within an opening in the bracket. Various set-screws may be used to lock the rod at different preferred positions within the bracket (so that the distance between the operator's eyes and the binocular eyepieces can be adjusted).

In various exemplary embodiments, the present invention provides either a two-point support stabilization system (inhibiting side-to-side motion); or a three-point stabilization system (inhibiting side-to-side and up-and-down motion).

DETAILED DESCRIPTION OF THE DRAWINGS

The present invention provides a system which is ideally suited for stabilizing images viewed through a pair of binoculars. It is to be understood, however, that the present invention is not limited to binocular use. Rather, the present invention can be used with any suitable optical instrument, for example, a still or video camera.

The present invention operates by inhibiting relative motion between the operator's eyes and the eyepieces of the binoculars. Such motion is common whenever an operator holds a pair of binoculars in their hands. In contrast to bulky tripod systems, however, the present invention provides a novel solution to image "jumping" by, in preferred aspects, using physical features on the operators face/head analogously to a sort of "tripod".

Figure 1:
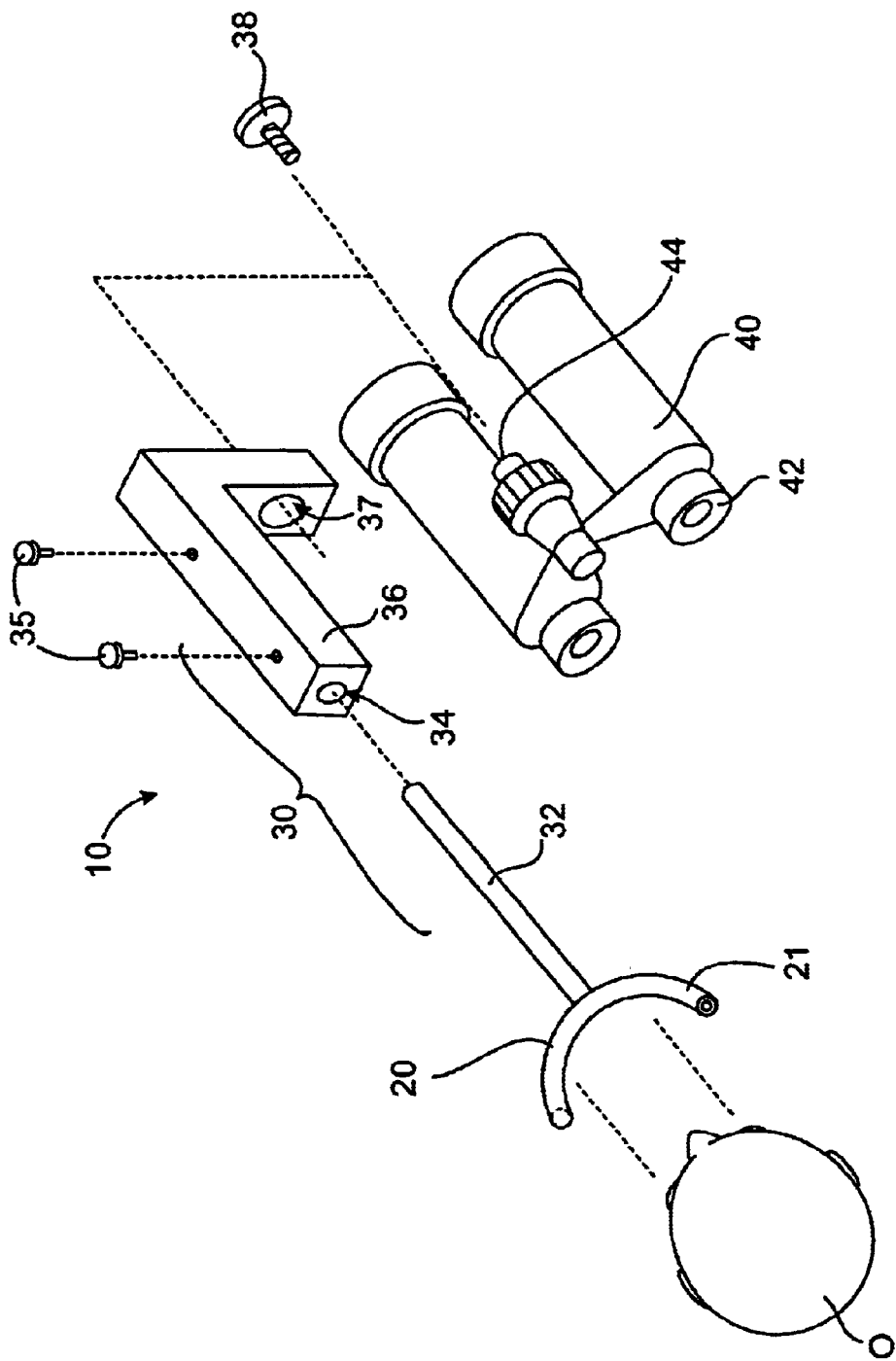
FIG. 1 is an exploded perspective view of the present invention.
Figure 2:
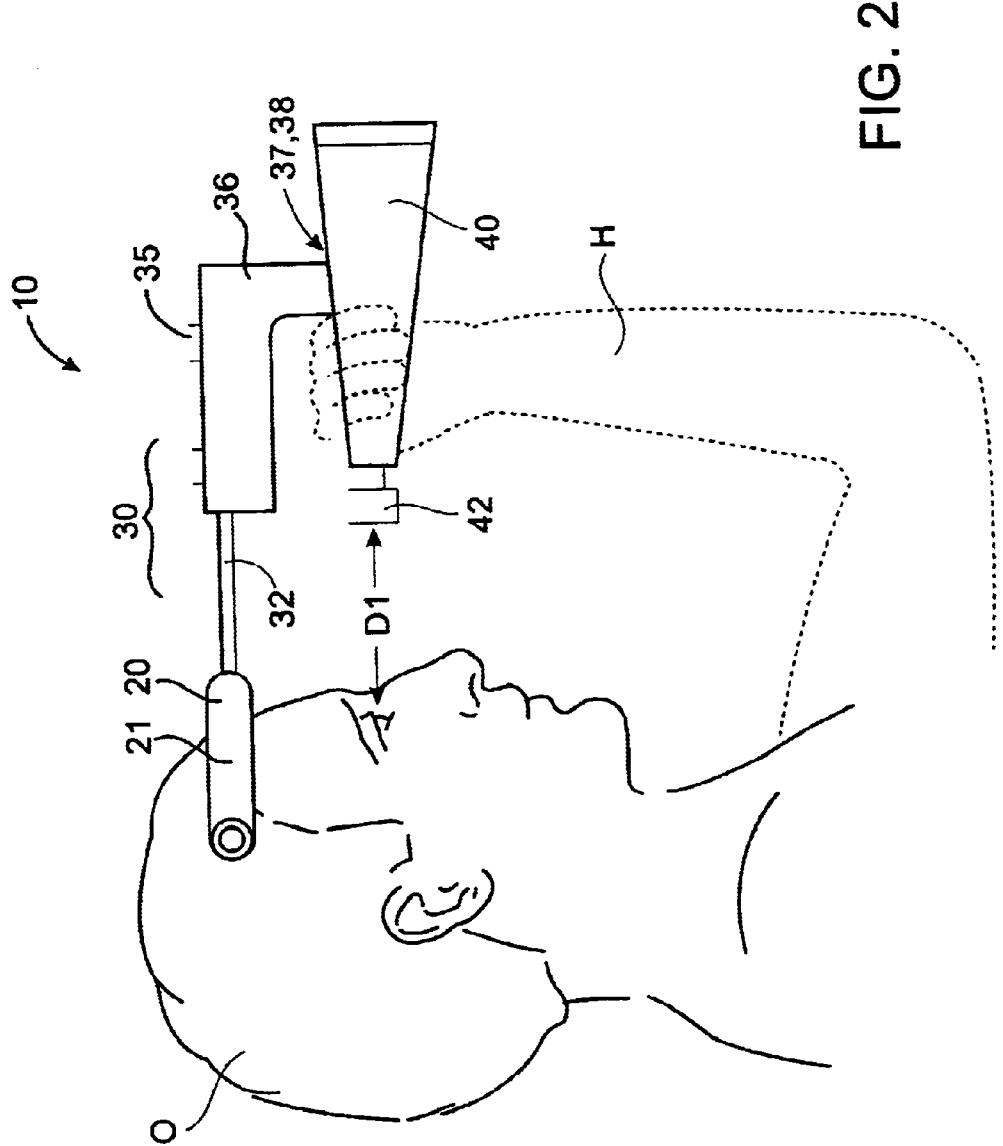
FIG. 2 is a side elevation view of the present invention in use.
Figure 3:
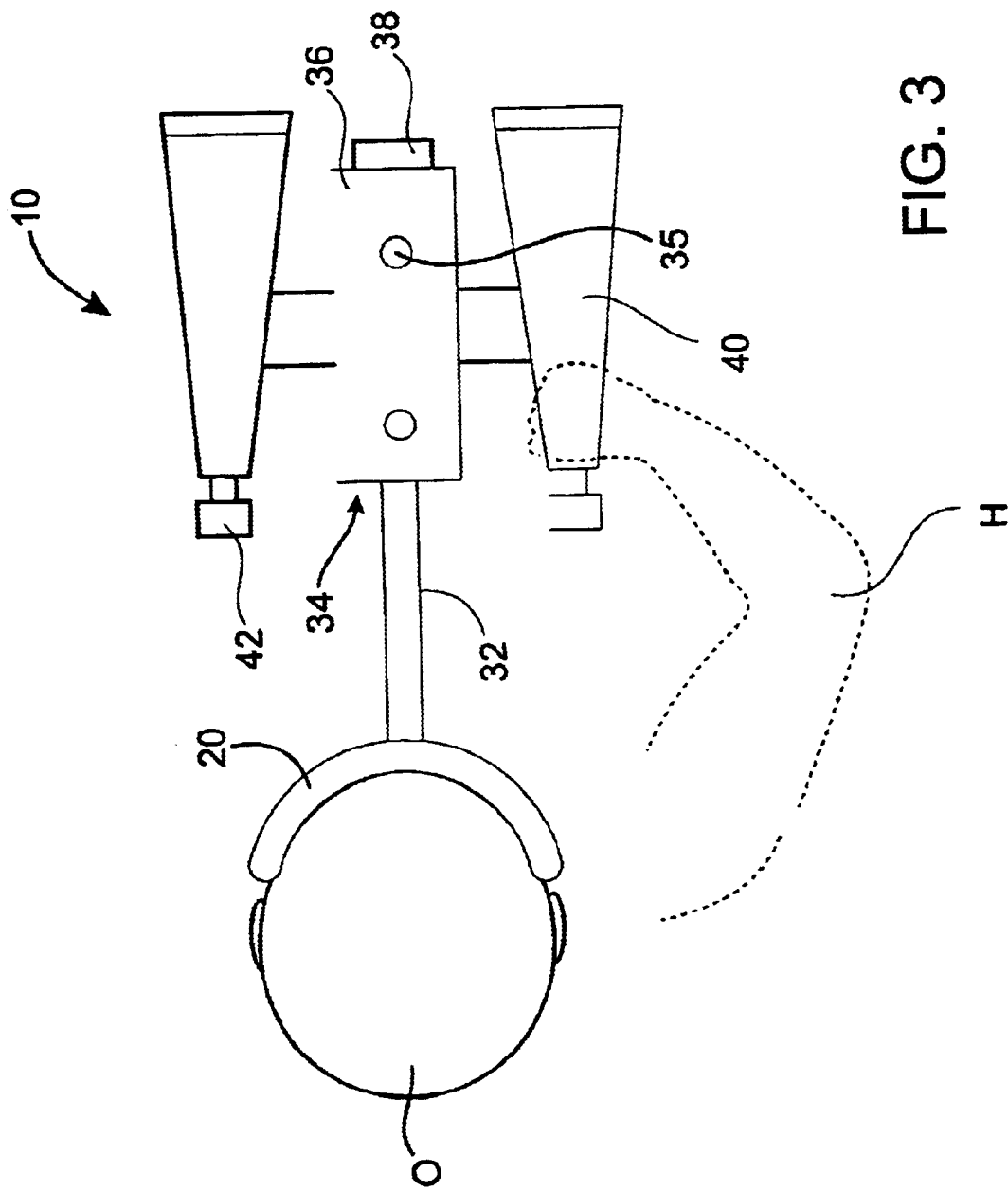
FIG. 3 is a top plan view of the present invention in use.

Referring first to FIG. 1, a stabilizer 10 is provided. Stabilizer 10 includes a forehead mount 20 and a mechanism 30 for connecting forehead mount 20 to a pair of binoculars 40. As can be seen in FIGS. 2 and 3, the operator O simply holds stabilizer 10 against their forehead and then looks through the binoculars. The hand H of the operator is shown in dotted lines. By using the physical features on the operator's forehead as a brace or support, the present invention minimizes relative motion between the operator's eyes and binocular eyepieces 42.

Mechanism 30 (which connects forehead mount 30 to binoculars 40) may comprise any of a variety of suitable mechanical mechanisms or linkages. Thus, the descriptions of this system given herein are meant to be exemplary, and are not meant to be limiting. In the exemplary embodiment shown, mechanism 30 comprises a rod 32 which is slidably received into a bore 34 in an L-shaped bracket member 36. Rod 32 is adjustably (slidably) positionable within bore 34 such that distance between forehead mount 20 and bracket member 36 can be adjusted. Thus, distance D1 (i.e.: the distance between the operator's eyes and binocular eyepieces 42) can be adjustably varied. In preferred aspects of the invention, mechanism 30 operates such that the observer's eyes are from about 10 mm to about 25 mm from binocular eyepieces 42. Various set-screws 35 can be received into holes in the top or sides or bottom of bracket 36 such that, when tightened, they hold rod 32 securely in a preferred position.

Bracket 36 preferably has a through hole 37 passing therethrough. Bracket 36 is attached to binoculars 40 by passing a bolt 38 passing through hole 37. Advantageously, most standard pairs of binoculars 40 are typically equipped with a screw hole 44 therein (for mounting the binoculars to a standard tripod). Thus, the present stabilizer can often be added directly to a pair of "store-bought" binoculars without having to modify the binoculars themselves in any way.

As can be seen most clearly in FIG. 3, forehead mount 20 is preferably curved (in a horizontal plane) so that it wraps around a portion of the operator's face. Such a design is particularly advantageous in inhibiting side-to-side movement of the binoculars relative to the operator's face. Forehead mount 20 can preferably be made from a lightweight material such as foam or lightweight plastic. In addition, the surface of forehead mount 20 may be covered with cushioning 21 for user comfort. As is seen in FIG. 2, at least a portion of forehead mount 20 is curved in a vertical direction (i.e. has no sharp edges) so that it can be comfortably positioned directly against different operators foreheads. For example, being generally tubular in shape, forehead mount 20 may be rotated up-and-down the surface of an operator's forehead to achieve a comfortable viewing position.

Figure 4:
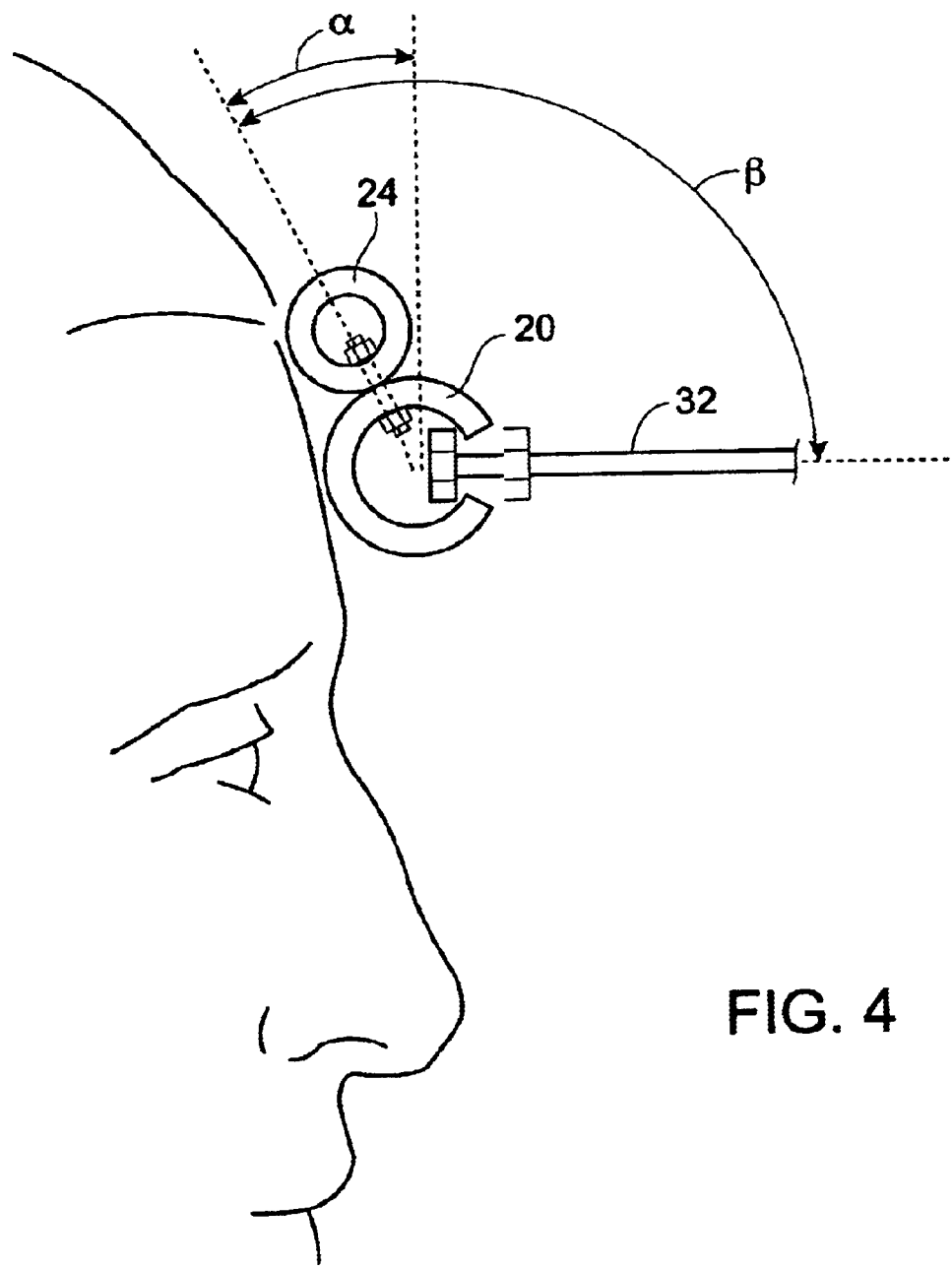
FIG. 4 is a sectional side elevation view of an embodiment of the invention which further stabilizes up-and-down movement of an image.

In optional preferred embodiments, to prevent the viewed image from "jumping" up-and-down, further vertical stabilization of the system may be provided, as follows. As shown in FIG. 4, stabilizer 10 may further comprise a vertical stabilizer 24 mounted on top of forehead mount 20. Vertical stabilizer 24 may be the same length as forehead mount 20, or it may instead be quite narrow and simply be centered on the operator's forehead. Vertical stabilizer 24 operates to inhibit up-and-down rotation of the stabilizer.

In preferred aspects, the angle ALPHA is adjustable such that the present invention can be fitted comfortably onto differently shaped operators foreheads (while still ensuring that binoculars 40 are held horizontally level). One exemplary system for providing such an adjustable system is as follows. Vertical stabilizer 24 is attached to forehead mount 20. Forehead mount 20 comprises a vertical slot 22 into which rod 32 is received. Thus the angle BETA between vertical stabilizer 24 and rod 32 can be adjusted. For example, rod 32 may be bolted in position in a vertical slot in forehead mount 20, as shown. By loosening and then tightening the bolt, rod 32 can be moved to various positions up-and-down in the vertical slot. In this illustrated embodiment, vertical stabilizer 24 is simply bolted on top of forehead mount 20. It is to be understood that this system is merely exemplary and that any suitable mechanical linkage or assembly can be used, all keeping within the scope of the present invention.

An unexpected advantage of the present invention is that it is ideally suited for persons who wear glasses, as the operator's glasses fit comfortably between the person's eyes and the binocular eyepieces. Prior to the present invention, persons wearing eyeglasses typically must remove their glasses when using binoculars. This is particularly troublesome for persons who have strong glasses. In accordance with the present invention, however, persons wearing eyeglasses need not remove their glasses when using the present invention. This is particularly advantageous since standard binoculars are not well suited to both correct a person's vision and provide magnification. This is especially true when the operator has very strong glasses, or has astigmatism. With the present stabilizer, however, persons wearing eyeglasses need not push the binocular eyepieces up against their glasses, thereby forcing their glasses against their faces. Nor are they required to take their glasses on and off when quickly switching between using the binoculars and not using the binoculars (which is an especially common problem when birdwatching).

As can be appreciated, the present invention provides an inexpensive, lightweight easy to operate system for stabilizing images viewed through a pair of binoculars. Thus, the present invention entirely avoids the need for complicated electronic image stabilization systems. Moreover, a further advantage of the present invention is that it can easily be added to existing binoculars. Also, being small, it may also fit within many regular binocular carrying cases.

Since image shaking is substantially reduced by the present invention, an operator is able to easily follow moving objects. Therefore, the present invention is ideally suited for birdwatchers. Moreover, the removal of image shaking also allows stable viewing of astronomical objects.

The present invention advantageously maintains a preferred separation distance between the operator's eyes and the binocular eyepieces (i.e.: the "eye-relief"). An advantage of maintaining a preferred eye-relief distance is that the operator is not constantly re-focusing the viewed image. Preferably, this separation distance is about 10 mm to 25 mm. Most preferably, this separation distance is adjustable to accommodate different users and different binoculars.

What is claimed is:

1. A stabilizer for viewing an image through a pair of binoculars, comprising:

a forehead mount; and a mechanism for connecting the forehead mount to the pair of binoculars, wherein the mechanism comprises:

a bracket adapted for attachment to said pair of binoculars; and a support between the forehead mount and the bracket, wherein the support is telescopically adjustable such that the distance between the forehead mount and the bracket can be adjustably varied.

2. The stabilizer of claim 1, wherein the mechanism is adjustable such that the distance between the observer's eyes and the eyepieces of the pair of binoculars can be adjustably varied.

3. The stabilizer of claim 1, wherein the support comprises a rod which is slidably received within an opening in the bracket.

4. The stabilizer of claim 1, wherein the forehead mount is curved to wrap across a portion of the operator's forehead.

5. The stabilizer of claim 1, wherein the forehead mount is made of lightweight plastics.

6. The stabilizer of claim 1, further comprising:

cushioning on the surface of the forehead mount.

7. The stabilizer of claim 1, wherein the forehead mount stabilizes motion of the pair of binoculars in a side-to-side direction.

8. The stabilizer of claim 1, wherein the forehead mount stabilizes motion of the pair of binoculars in a up-and-down direction.

9. The stabilizer of claim 1, wherein the bracket is L-shaped.

10. The stabilizer of claim, the stabilizer positions the forehead mount such that an observer's eyes are about 10 mm to 25 mm from an eyepiece of the pair of binoculars.

11. The stabilizer of claim 1, wherein at least a portion of the forehead mount is curved to be rotatable up-and-down on the surface of an operator's forehead.

12. The stabilizer of claim 1, wherein the forehead mount comprises an upper and a lower portion, wherein one of the upper or lower portions inhibits side-to-side motion of the stabilizer, and the other of the upper or lower portion inhibits up-and-down motion of the stabilizer.

* * * * *